C. A. PARSONS & J. TURNBULL.
FLUID PRESSURE PACKING.
APPLICATION FILED MAR. 30, 1908.

909,324.  Patented Jan. 12, 1909.

2 SHEETS—SHEET 1.

C. A. PARSONS & J. TURNBULL.
FLUID PRESSURE PACKING.
APPLICATION FILED MAR. 30, 1908.

909,324.

Patented Jan. 12, 1909.

2 SHEETS—SHEET 2.

Attest:
Ewd L. Folson
Bent M. Stahl

Inventors:
Charles Algernon Parsons &
John Turnbull
by Spear, Middleton, Donaldson & Spear
Attys.

UNITED STATES PATENT OFFICE.

CHARLES ALGERNON PARSONS, OF NEWCASTLE-UPON-TYNE, AND JOHN TURNBULL, OF WALLSEND, ENGLAND; SAID TURNBULL ASSIGNOR TO SAID PARSONS.

FLUID-PRESSURE PACKING.

No. 909,324.  Specification of Letters Patent.  Patented Jan. 12, 1909.

Application filed March 30, 1908. Serial No. 424,171.

*To all whom it may concern:*

Be it known that we, CHARLES ALGERNON PARSONS, C. B., a subject of the King of Great Britain and Ireland, and residing at Heaton Works, Newcastle-upon-Tyne, in the county of Northumberland, England, and JOHN TURNBULL, of the Parsons Marine Steam Turbine Company, Limited, a subject of the King of Great Britain and Ireland, and residing at Wallsend-upon-Tyne, in the county of Northumberland, England, have invented certain new and useful Improvements Relating to Fluid-Pressure Packings and the Like, of which the following is a specification.

This invention relates to fluid pressure packings and is specially applicable to the glands of rotating shafts of turbines and compressors where the shafts pass through the cylinders.

In packing glands as at present constructed in many turbines, one or more annular spaces are provided around the gland sleeve which carries the labyrinth packing. In such glands water is liable to collect at the bottom of the annular space when the turbine is running, and suitable draining arrangements are necessary to remove this water when the turbines are standing. It is found that this accumulation of water tends to cause corrosion of the gland casing at this part.

The object of the present invention is to provide an improved gland in which the water cannot accumulate in the gland.

The invention consists in an improved packing gland in which the "lantern" space or spaces outside the gland sleeve are continued only as far round as about the level of the underside of the shaft, suitable communicating means being provided through the gland sleeve whereby the whole gland is rendered self-draining.

Figure 1:
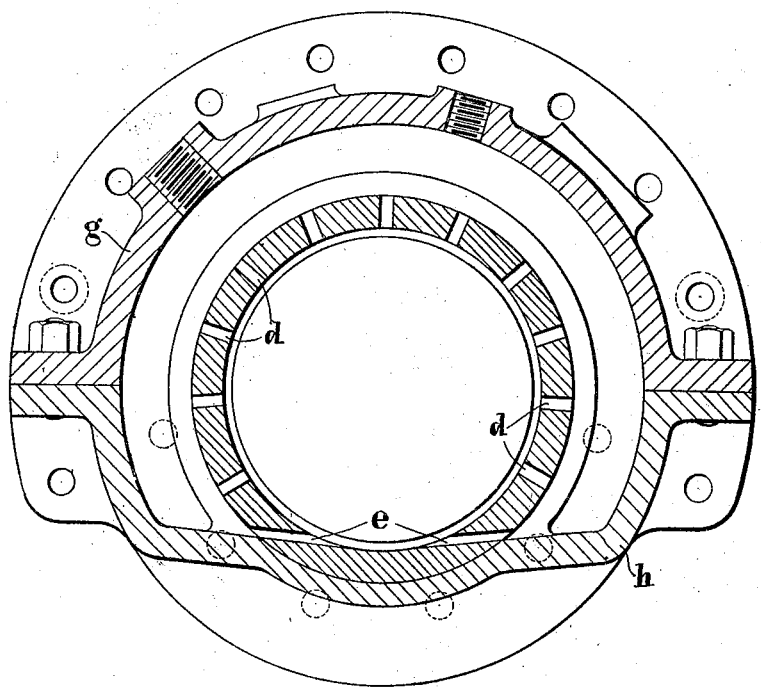
Figure 2:
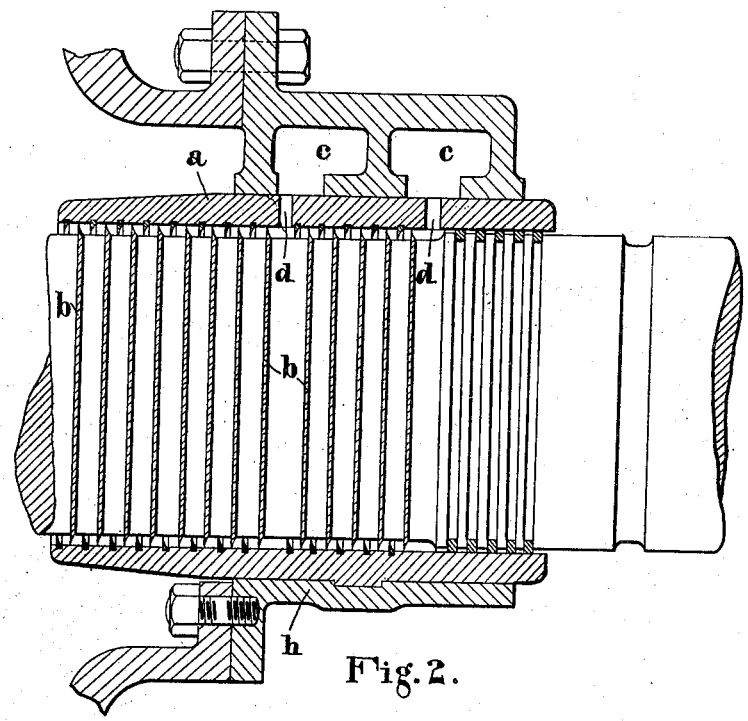
Figure 3:
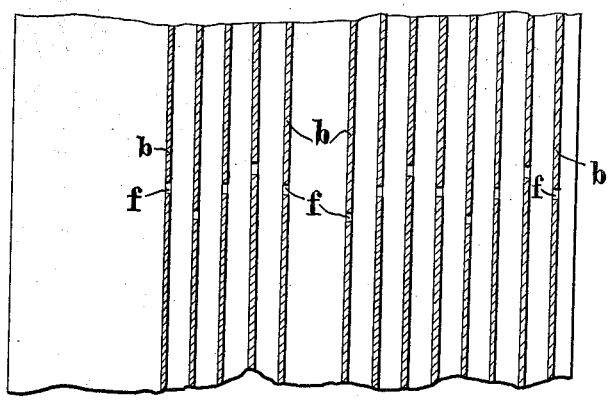

Referring now to the accompanying drawings, Figure 1 is a cross sectional elevation and Fig. 2 is a longitudinal sectional elevation of a packing gland according to one form of the invention; Fig. 3 is a part plan of the gland sleeve showing slots formed in the labyrinth packing rings.

In carrying this invention into effect according to one construction as applied to the packing gland of a steam turbine, outside the sleeve $a$, which carries the labyrinth packing strips $b$, there is formed one or more "lantern" spaces, $c\,c$, but instead of carrying these "lantern" spaces entirely round the sleeve, they are carried over the top of the shaft and down only to about the level of the bottom of the shaft. Radial holes, $d$, are drilled through the sleeve to establish communication between the labyrinth packings and the "lantern" spaces but at the bottom of the "lantern" spaces horizontal or slightly sloping holes $e$, are formed in the sleeve so that the bottom of the "lantern" spaces may drain into the labyrinth packing of the gland. Along the bottom of the gland sleeve, slots, $f$, may be cut in the gland strips, $b$, of the labyrinth packing to permit drainage back into the cylinder of the turbine. These slots in the strips are preferably staggered to reduce the flow of steam or air through them as shown in Fig. 3. The gland casing in which the "lantern" spaces are formed is preferably made in two portions, $g$ and $h$, separately attachable to the turbine casing. The lower half of the gland casing, however, may if desired, be formed in one with the lower half of the turbine casing, the top half being detachable; or in smaller sizes of plant, both halves of the gland casing may be formed in one with the corresponding halves of the turbine casings.

Having now described our invention, what we claim as new and desire to secure by Letters Patent is:—

1. A packing gland having a sleeve and outside said sleeve one or more spaces extending partly round the sleeve to about the level of the underside of the shaft and passages between said valve and said space or spaces acting to render the gland self-draining.

2. A packing gland comprising a sleeve carrying rings of a labyrinth packing, a carrying element for said gland, a groove in said carrying element extending over the sleeve and down to about the level of the underside of the shaft, passageways through the sleeve from the groove to the labyrinth packing acting to drain said grooves and openings in the labyrinth rings at the bottom of the gland acting to drain water into the turbine.

In testimony whereof, we affix our signatures in presence of two witnesses.

CHARLES ALGERNON PARSONS.
JOHN TURNBULL.

Witnesses:
HENRY GRAHAM DAKYNS, Jnr.,
WILLIAM MENZIES JOHNSTON.